(12) United States Patent
Drumm et al.

(10) Patent No.: US 9,039,198 B2
(45) Date of Patent: May 26, 2015

(54) PROJECTION APPARATUS HAVING IMPROVED PROJECTION PROPERTIES, AND METHOD AND PROCEDURE, RESPECTIVELY, FOR PROJECTING AN IMAGE

(75) Inventors: Jan Oliver Drumm, Regensburg (DE); Henning Rehn, Berlin (DE); Bakuri Lanchava, Regensburg (DE); Wolfgang Pabst, Deisenhofen (DE); Robert Kraus, Regensburg (DE)

(73) Assignee: OSRAM Gesellschaft mit beschraenkter Haftung, Munich (DE)

( * ) Notice: Subject to any disclaimer, the term of this patent is extended or adjusted under 35 U.S.C. 154(b) by 1589 days.

(21) Appl. No.: 12/514,917

(22) PCT Filed: Nov. 8, 2007

(86) PCT No.: PCT/EP2007/009688
§ 371 (c)(1),
(2), (4) Date: Feb. 5, 2010

(87) PCT Pub. No.: WO2008/058671
PCT Pub. Date: May 22, 2008

(65) Prior Publication Data
US 2010/0149497 A1    Jun. 17, 2010

(30) Foreign Application Priority Data

Nov. 14, 2006  (DE) .......................... 10 2006 053 639
May 31, 2007   (DE) .......................... 10 2007 025 330

(51) Int. Cl.
*G03B 21/14*  (2006.01)
*G03B 21/00*  (2006.01)
*H04N 9/31*   (2006.01)
*H04N 13/04*  (2006.01)

(52) U.S. Cl.
CPC .............. *G03B 21/00* (2013.01); *H04N 9/3129* (2013.01); *H04N 9/317* (2013.01); *H04N 13/0427* (2013.01); *H04N 13/0434* (2013.01)

(58) Field of Classification Search
USPC .............. 353/85, 30, 31; 356/153; 359/213.1, 359/196.1; 250/261
See application file for complete search history.

(56) References Cited

U.S. PATENT DOCUMENTS 4,684,996 A  8/1987  Baumeister
4,689,482 A  8/1987  Horikawa et al.
(Continued)

FOREIGN PATENT DOCUMENTS

CN  1242906 A  1/2000
CN  1764871 A  4/2006
(Continued)

OTHER PUBLICATIONS

English language abstract of JP 4264416 A.
(Continued)

*Primary Examiner* — William C Dowling
*Assistant Examiner* — Jerry Brooks

(57) ABSTRACT

In a method for projecting an image onto a projection area (10) by at least one first (110) and second (210) beam, in order to create an improved image on the projection area, the deviation of the projection of the first and second beam on the projection area is determined, and the intensity of the first and/or second beam is varied over time according to the previously determined deviations.

16 Claims, 10 Drawing Sheets

(56) References Cited

U.S. PATENT DOCUMENTS

| | | | |
|---|---|---|---|
| 4,827,436 A * | 5/1989 | Sabersky et al. | 250/559.36 |
| 4,992,803 A | 2/1991 | Larson et al. | |
| 6,091,461 A | 7/2000 | Bardmesser | |
| 6,424,412 B1 | 7/2002 | Matthews | |
| 6,590,606 B1 | 7/2003 | Hiller et al. | |
| 6,953,251 B2 * | 10/2005 | Seki et al. | 353/85 |
| 2003/0015652 A1 | 1/2003 | Kandori et al. | |
| 2003/0123031 A1 * | 7/2003 | Nelson et al. | 353/31 |
| 2005/0110954 A1 | 5/2005 | Kojima | |
| 2005/0111107 A1 | 5/2005 | Takeda et al. | |
| 2005/0140832 A1 | 6/2005 | Goldman et al. | |
| 2005/0168728 A1 * | 8/2005 | Stern et al. | 356/153 |
| 2005/0279922 A1 | 12/2005 | Wittenberg et al. | |
| 2006/0044297 A1 | 3/2006 | Furukawa et al. | |
| 2006/0187421 A1 | 8/2006 | Hattori et al. | |
| 2006/0227087 A1 | 10/2006 | Hajjar et al. | |

FOREIGN PATENT DOCUMENTS

| | | |
|---|---|---|
| EP | 0140508 A1 | 5/1985 |
| EP | 0390969 A2 | 10/1990 |
| EP | 1351522 A2 | 10/2003 |
| EP | 1607795 A1 | 12/2005 |
| EP | 1640799 A1 | 3/2006 |
| JP | 04181289 A | 6/1992 |
| JP | 4264416 A | 9/1992 |
| KR | 1019980017352 A | 6/1998 |
| WO | 2006050263 A2 | 5/2006 |

OTHER PUBLICATIONS

English language abstract of KR 1019980017352 A.
International Search Report of PCT/EP2007/009688 mailed May 27, 2009.
English language abstract of JP 04181289 A.

* cited by examiner

PROJECTION APPARATUS HAVING IMPROVED PROJECTION PROPERTIES, AND METHOD AND PROCEDURE, RESPECTIVELY, FOR PROJECTING AN IMAGE

CROSS-REFERENCE TO RELATED APPLICATIONS

This application is a United States national phase filing under 35 U.S.C. §371 of International Application No. PCT/EP2007/009688, filed Nov. 8, 2007 which claims priority to German Patent Application No. 10 2006 053 639.8, filed Nov. 14, 2006 and German Patent Application No. 10 2007 025 330.5, filed May 31, 2007. The complete disclosure of the above-identified application is hereby fully incorporated herein by reference.

TECHNICAL FIELD

The invention relates to a projection apparatus and a method for projecting with improved projection properties.

BACKGROUND

In devices for projecting images several beams are superimposed for each pixel and projected onto a projection screen. In doing so, in an ideal case a single spot is generated on the projection screen which is composed of the colors of the beams. Using a so called "Flying Spot Method", the beams are directed in front of the projection screen by a movable mirror, by which via appropriate motion an image may be generated on the projection screen. Minimal angular deviations of the superimposed beams, caused by production, result in an incongruity of the single spots on the projection screen which causes color defects in the projected image. Due to thermal stress the deviation of single spots may also change during operation.

SUMMARY

It is a goal of the invention to provide a method for projecting an image which is characterized by improved projection characteristics and thus reduces the above mentioned disadvantages.

Using the method and the procedure, respectively, an image is generated by means of projecting at least one first and one second beam onto a projection screen, wherein by the superimposition of the projection of the first and the second beam onto the projection screen a reference impression of the image is to be generated. However, a actual deviation of the projection of the at least first and second beam onto the projection screen generates an actual impression which deviates from the reference impression. The method comprises the method steps A) determination of the actual deviation of the projection of the first from the second beam on the projection screen, and B) temporal intensity variation of the first and/or second beam according to the deviations determined in method step A) to generate the reference impression. This has the advantage that the image quality of the projector is improved. Furthermore, production costs may be lowered, since as compared to systems existing as yet manufacturing tolerances may be kept lower. In addition, due to the self-calibration of the position of the projection onto the projection screen the long-term stability of the projector is improved significantly. The method for projecting an image results in a more exact superimposition of the beams and thus in an improved color and image quality.

A further favorable characteristic of the method and the procedure, respectively, is a first mirror, which directs the at least first and second beams for projecting the pixels onto the projection screen. Advantageously, this first mirror is movable. This results in the advantage that an image is generated on the projection plane by means of appropriate motion of the first mirror.

Advantageously, this first mirror is actuated electronically. This results in the advantage that the motion of the mirror may be modulated by means of the electronic actuation when indicated.

Furthermore, the method and the procedure, respectively, may have the favorable characteristic that laser beams may be used as first and second beams. The wavelength range of the laser beams thereby advantageously comprises a red, green or blue spectral range. The usage of laser beams is favorable, because using those, a particularly exact image having well defined color mixtures may be generated. The selection of the spectral ranges red, green and blue results in the advantage, that the complete color spectrum may be represented.

Furthermore, the at least first and second beams each may have a first and second intensity, which is generated by means of at least one first and one second electronic signal. This results in the advantage that by means of an appropriate composition of the intensities a plurality of colors may be generated. The lower the intensity of a color is the stronger is the hue of the other beams. Thus, each of the projection pixels on the projection screen may be formed individually.

Advantageously, the method and the procedure, respectively, for projecting an image comprise different embodiments differing in that if the method steps A) and B) are implemented before or during the projecting operation. Furthermore, both variants allow for implementing the method step A) such that the first mirror has a variable orientation or such that the first mirror has a fixed orientation.

In a favorable embodiment of the invention, for implementing the method step A) a second mirror is positioned between the first mirror and the projection screen. In doing so, at any one time only a single beam is operating. The second mirror results in the advantage, that it may deflect the beam currently operating from the projection screen. This deflection from the projection screen may be implemented for each of the beams. Advantageously, a semi-transparent mirror, or a tilted mirror are used as the second mirror. A semi-transparent mirror has the advantage that it deflects the beam which is currently operating only partially from the projection screen, however, it furthermore lets arrive another part of the beam onto the projection screen. However, it is also possible to utilize a non-transparent second mirror, since in this embodiment of the invention the method step A) is carried out prior to the actual projecting operation. In other words, an at least partial projection of the beam onto the projection screen during the method step A) is not necessary in this embodiment of the invention.

In a favorable embodiment of the method and of the procedure, respectively, the second mirror is positioned such that it directs the respective beam currently operating at least partially onto a detector having a fixed position. This has the advantage, that the position of the projection of the beam which is currently operating may be measured on the detector. However, a part of the beam may further be observed on the projection screen. Advantageously, the beam which is currently operating generates a projection on the detector to which it is directed.

Favorably, the respective beam which is operating is focused by means of a lens present in front of the detector. This has the advantage that the width of the beam, which is given due to technical reasons, may be focused onto a small spot. This results in the advantage that the detection of the position of the projection of the beam may be carried out more precisely.

In a further favorable embodiment of the invention the first mirror for the first beam is brought into a first orientation in which a maximum intensity of the first beam is measured at the detector. Advantageously, the first mirror is also brought into a second orientation for the second beam, in which a maximum intensity of the second beam is measured at the detector. This results in the advantage that a defined orientation of the first mirror is achieved for each beam which corresponds to the position of the projection of the beam on the detector. In order to achieve yet more precise results it is furthermore favorable to measure a third orientation of the first mirror for the first mirror for the first beam at which the first beam has a maximum intensity on a second detector. Similarly, a fourth orientation of the first mirror may be measured for the second beam at which the second beam has a maximum intensity on a second detector. This has the advantages that both for the first as well as for the second beam further orientations of the mirror are achieved which correspond to the position of the projection of the beams on a second detector.

Following the determination of the mirror orientations for each of the beams it is favorable to determine the deviation of the beams from each other by means of the difference of the mirror orientations. For this purpose it is favorable to measure the orientations of the mirrors using an appropriate method.

Advantageously, the first and second and/or the third and fourth orientations of the first mirror are measured contactless via the capacitance between the mirror and a counterpart. From the difference between the first and second and/or the third and fourth orientations of the first mirror the actual deviation of the first and second beams may be determined. The determination of two differences, the first and second orientations and the third and fourth orientations, has the advantage that more precise results are achieved. A mean value may be calculated from the two differences. The measurement of the orientations via the capacitance has the advantage that no disturbances in the orientation of the mirror can be caused by means of the contactless measuring method.

Furthermore, the first and second and/or the third and fourth orientations of the first mirror may be measured using a mechanical sensor. From the difference between the first and second and/or the third and fourth orientations of the first mirror the actual deviation between the first and second beam may be determined. The mechanical sensor has the advantage that it delivers particularly precise measurement results for the orientation of the mirror.

Furthermore, the first and second and/or the third and fourth orientations of the first mirror may respectively be determined thus that the first mirror is irradiated with a additional beam whose deflection is determined by means of a second detector. In doing so, the orientation of the first mirror is determined by means of the deflection of the additional beam. Advantageously, the additional beam is arranged with an inclined angle in relation to the at least first and second beams. This measurement method for the orientation of the mirror has the advantage that it is conducted interference-free with respect to the remaining projecting operation.

In a further embodiment of the invention a angular deviation between the first and second beams is determined from the first and second and/or the third and fourth orientations of the first mirror. The angular deviation determined serves the determination of the actual deviation between the first and second beams on the projection screen. This has the advantage that by means of the measurement of the orientations of the mirror for the respective beam the angular deviation may be calculated and in doing so the deviation of the beams of each other on the projection screen may be determined without measuring it directly.

A further favorable characteristic of a further exemplary embodiment of the invention is the projection of an image, wherein during the method step A) the first mirror for each beam is held in at least one fixed orientation. Advantageously, a detector is brought into a first position for the first beam and into a second position for the second beam, where a respective maximum intensity of the respective beam is measured at the detector. This has the advantage that the first mirror does not have to be moved deliberately in order to define certain positions of the beams.

Following the determination of the detector positions for each of the beams it is favorable to determine the deviation of the beams from each other by means of the difference of the detector positions. For this purpose it is favorable to measure the detector positions using an appropriate method.

It is furthermore favorable to measure the first and second positions of the detector contactless by means of the capacitance between the detector and a counterpart. From the difference between the first and second positions of the detector the actual deviation between the first and second beams may be determined.

Furthermore, it is favorable to measure the first and second positions of the detector by means of a mechanical sensor, and to determine the actual deviation of the first and second beams from the difference between the first and second positions of the detector. The contactless measurement method of the position of the detector by means of the measurement of the capacitance has the advantage that a measurement is carried out which does not create disturbances in the position of the detector. The measurement of the position of the detector by means of a mechanical sensor has the advantage that particularly precise results for the position of the detector may be achieved.

In a further embodiment it is favorable for the determination of the position of the projection of the beams to employ a plurality of detectors, a so called detector array, on the detector. Advantageously, this is thereby realized by means of a substantially two dimensional matrix of detectors, for example a CCD (Charge Coupled Device) array. In doing so, it is favorable if the plurality of detectors is positioned such that all positions of the projections of the beams on the plurality of detectors may be measured. This has the advantage that a motion of the detector for detecting all projections of the beams on the detector is no longer necessary.

Advantageously, the respective beam which is operating is focused by means of a lens present in front of the plurality of detectors. This has the advantage that the width of the beam resulting from technical reasons is minimized and such the detection of the position of the projection of the beam becomes more precise.

Favorably, a angular deviation between first and second beams is determined from the positions of the projection of the beams on the plurality of detectors. The angular deviation determined is used to determine the actual deviation of the first and second beams on the projection screen. This has the advantage that the position of the projections of the beams on the projection screen may be determined without measuring them directly on the projection screen. The measurement is carried out by means of the measurement of the position of the projection of the beams on the detector.

In a further embodiment of the invention it is a favorable characteristic that a third beam is present whose deviation from a first and/or second beam is determined according to the above described method and the various embodiments. The application of a third beam has the advantage that the spectrum of colors which may be formed by means of the beams is significantly extended. If three beams are used and if these comprise the three elementary colors red, blue and green, a true color projection of the image may advantageously be achieved.

In a further favorable embodiment of the invention the favorable characteristic exists that a second semi-transparent mirror is positioned between the first mirror and the projection screen for implementing the method step A). In doing so, advantageously all beams are operating simultaneously, wherein they generate the reference impression on the projection screen. In doing so, it is favorable if the beams are partially directed onto a detector by means of the second mirror. This results in the advantage that the beams generate an image on the projection screen and may be directed onto a detector simultaneously. Thus, a detection of the beams is possible while at the same time the projection of an on the projection screen is taking place. In other words thus method step A) may be carried out while the projection apparatus is operating.

Furthermore, it is favorable if a filter is provided for separating the beams between the second mirror and the detector. The filter has the advantage that it is respectively permeable for a beam in the direction to the detector. The remaining beams thus may not disturb the detection of the one beam.

Furthermore, it is favorable if a diffractive element for separating the beams is provided behind the second mirror. It is the advantage of a diffractive element that it may separate the beams and may direct them in different directions. For this purpose it is favorable, if a plurality of detectors, for example a detector array, is used as the detector. The respective beam directed onto the plurality of detectors creates a projection on the plurality of detectors. This results in the advantage that a plurality of detectors may detect all beams, which have been separated by means of a diffractive element.

Furthermore, it is favorable if the plurality of detectors has a fixed position. Favorably, the mirror thereby is brought into a first orientation in which the plurality of detectors measures an intensity maximum of the first beam. Furthermore, it is favorable if the first mirror is brought into a second orientation in which the plurality of detectors measures an intensity maximum of the second beam. This results in the advantage that an orientation of the first mirror may be related to the intensity of the beam on the plurality of detectors.

It is furthermore favorable if the first mirror is brought into a third orientation in which the plurality of detectors measures an intensity maximum of the first beam. Furthermore, it is favorable if the first mirror is brought into a fourth orientation in which the plurality of detectors measures an intensity maximum of the second beam. A measurement of a third and a fourth orientation of the first mirror is favorable, since the accuracy of measuring the mirror orientation is increased thereby.

Following the determination of the mirror orientations for each of the beams it is favorable to determine the deviation of the beams of each other by means of the difference of the mirror orientations. For this purpose it is favorable to measure the orientations of the mirrors by means of an appropriate method.

Furthermore, it is favorable if the first and second and/or the third and fourth orientations of the first mirror are respectively measured contactless by means of the capacitance between the mirror and a counterpart. From the difference between the first and second and/or the third and fourth orientations of the first mirror thereby the actual deviation of the first and second beams may be determined. This results in the advantage that the deviation of the beams of each other on the projection screen may be determined by means of the orientations of the mirror without measuring it directly thereon. The contactless measurement method by means of the capacitance has the advantage that no disturbance of the orientation of the mirror may take place.

Furthermore, it is favorable if the first and second and/or the third and fourth orientations of the first mirror are respectively measured by means of a mechanical sensor. In doing so, from the difference between the first and second and/or the third and fourth orientations of the first mirror the actual deviation of the first and second beams may be detected. This results in the advantage that a measurement of the orientation of the first mirror by means of the mechanical sensor leads to very precise results concerning the orientation of the mirror.

It is furthermore favorable, if the first and second and/or the third and fourth orientations of the first mirror is respectively determined thus that the first mirror is irradiated with an additional beam. The deflection of the additional beam by means of the first mirror is thereby determined by means of a second detector. The orientation of the first mirror may thereby be detected by means of the deflection of the additional beam. This is a particularly favorable measurement method for the orientation of the first mirror, since the operation of the projector is not disturbed thereby. It is therefore favorable, if the additional beam is arranged with an inclined angle in relation to the at least first and second beams. This has the advantage that no interferences between the beams are possible.

A further favorable embodiment is the determination of the first and second and/or the third and fourth orientations of the first mirror, from which a angular deviation between the first and second beams is determined. The determination of the actual deviation of the first and second beams on the projection screen may be achieved by means of the determined angular deviation. This has the advantage that the actual deviation of the beams of each other on the projection screen may be achieved by means of the determination of the mirror orientations.

A further favorable characteristic of a further embodiment is a method step A), wherein the first mirror has at least one defined orientation for each beam. This has the advantage that the mirror does not have to be moved additionally.

In doing so, it is favorable if a detector is brought into a first position for the first beam and into a second position for the second beam. In doing so, a maximum intensity of the respective beam is respectively measured at the detector.

Furthermore, it is favorable if the first and second positions of the detector are measured contactless by means of the capacitance between the detector and a counterpart. From the difference between the first and second positions of the detector the actual deviation between the first and second beams may be determined thereby. This has the advantage that by means of the contactless measurement method of the position of the detector the position can not be disturbed. Furthermore, the position of the detector is related to the orientation of the mirror and thereby to the position of the beams.

Furthermore, it is favorable if the first and second positions of the detector are measured by means of a mechanical sensor. From the difference between the first and second positions of the detector the actual deviation of the first and second beams may be determined thereby. The measurement method by means of a mechanical sensor has the advantage that it results in particularly exact measurement results of the position of the detector.

It is furthermore favorable, if for determining the position of the projection of the beams on the detector a plurality of detectors is used. In doing so, it is particularly favorable, if the plurality of detectors is positioned such that all projections of the beams on the plurality of detectors can be measured. This has the advantage that the plurality of detectors does not have to be moved into a respective new position for each beam. Furthermore, it is favorable if the respective beam is focused by means of lens present in front of the plurality of detectors. This has the advantage that the width a beam, which arises due to technical reasons, is minimized and thus the accuracy of measurement of the position of the beam on the detector is increased.

A further favorable embodiment exists in that a angular deviation between the first and second beams is determined from the positions of the projection of the beams on the plurality of detectors. The determination of the actual deviation of the first and second beams on the projection screen may be determined by means of the application of the angular deviation between the first and second beams. This results in the advantage that a indirect measurement of the position of the beams on the projection screen is carried out, wherein the position of the projection of the beams on the detectors is measured.

In a further favorable embodiment a third beam is provided, whose deviation from first and/or second beams is determined according to the method of the above described embodiments. This has the advantage that the application of three beams results in a broader color spectrum and thus an image more multifaceted in terms of color may be generated.

In a further favorable embodiment a phase shift relative to the second electronic signal is determined from angular deviations of the at least first electronic signals determined in method step A). This has the advantage that the orientation from the mirror and the position of the detectors, respectively, result in values for angular deviations, to which the activation of the beams may be related.

Furthermore, it is favorable if in method step B) the reference impression is reconstructed using temporal intensity variation of the first and/or second electronic signals by means of the determined phase shift from the actual impression. This leads to the advantage that the reconstruction of the reference impression on the projection screen is not effected by means of a mechanical transformation of the projector but by means of the calculation of a phase shift and the thus possible temporal intensity variation of the electronic signals, which are responsible for controlling the beams. The temporal intensity variation thereby advantageously comprises a temporal delay of at least one electronic signal for the activation of a beam. Thus, favorably the reference impression of the image on the projection screen may be generated, if for example the pixels are generated line by line by means of the at least first and second beams (Flying Spot Method)

In a further favorable embodiment of a further exemplary embodiment a line by line generation of the pixels on the projection screen (line raster) may be abandoned. The inventive method is also applicable to any trajectories of the beams on the projection screen; as such the trajectory may run along a curve deviating from a straight line. In an embodiment the trajectory delineates Lissajous type representations on the projection screen.

In a further, particularly favorable embodiment a projection apparatus has a first and second source of radiation for generating a first and second beam as well as a projection device for projecting the first and second beams onto a projection screen. In doing so, it is favorable if an image is projected onto the projection screen. The projection apparatus may further comprise a electronic control for the first and second source of radiation as well as a detection device for detecting a deviation between the projection of the first and second beams on the projection screen. In doing so, it is favorable if the projection apparatus is arranged such that depending on the deviation detected between the projection of the first and second beams on the projection screen the electronic control for the first and/or second source of radiation can be temporally delayed by means of the detection device such that the deviation is reduced or corrected. This is to mean that each image pixel on the projection screen displayed by means of the beams can be displayed clearer by means of the temporal delay of the beams, since the temporal delay of the local deviation of the beams of each other counteracts due to the inertia of the perception of an external observer. This has the advantage that the projection apparatus does not have to be altered mechanically in order to improve the image quality on the projection screen. Merely a technical measurement method is necessary to alter the electronic activation of the beams with the values and calculations derived to that effect that the image quality is improved.

A further favorable characteristic exists in that the at least first and second sources of radiation of the projection apparatus comprise laser. In doing so, it is favorable if the wavelengths emitted by the laser comprise a red, green or blue spectral range. From this the advantage results that by means of this color selection of lasers a broad spectrum of colors may be displayed.

Furthermore, it is favorable if the electronic control for the first and second sources of radiation creates separate electronic signals. This has the advantage that each single source of radiation and thus each single beam may be activated separately. A potential temporal intensity variation of the signal for a single beam is thus facilitated. It is furthermore favorable, if a electronic signal for generating an image is provided which comprises video electronics. This has the advantage that a moving image may be generated by means of the projection apparatus.

It is a further favorable characteristic, if the electronic control for the source of radiation comprises a driver for controlling the signal. This has the advantage that the electronic signals for the radiation sources may be transferred more precise and possibly faster.

A further favorable characteristic of a further embodiment is a first mirror, which is provided for the direction of the at least first and second beams onto the projection screen. It is furthermore favorable, if the first mirror is activated by a electronic driver. This has the advantage that the beams may be directed onto the projection screen by means of the electronically activated first mirror and thereby the motion of the first mirror may be activated independent of the beams.

Furthermore, it is favorable if a second mirror for directing the at least first and second beams onto the detection device is provided. In doing so, it is favorable that a detection of the beams on a detector is possible.

A further favorable characteristic is a filter which is provided between the second mirror and the detection device. This filter has the advantage that it lets pass a desired beam to the detection device while it filters out the other beams.

Furthermore, it is favorable if diffractive elements are provided between the second minor and the detection device.

This has the advantage that the beams may be divided and may be directed in different directions behind the diffractive element.

It is furthermore favorable, if a lens for focusing the radiation is provided between the second mirror and the detection device. This has the advantage that the width of the beams, which arises due to technical reasons, is minimized and thus the detection of the position of the projections of the beams on the detection device is improved.

A further favorable characteristic is a control unit, for example a semiconductor chip, which is connected to the first mirror and the detection device via read data lines. This has the advantage that the electronic control element is provided with data about the orientation of the first mirror and about the position of the detection device.

It is furthermore favorable, if the control unit is connected to the driver of the first mirror and the electronic control for the first and second sources of radiation via read data lines. This has the advantage that the electronic control element may process the data received via the read data lines and may forward new data to the driver of the first mirror and to the electronic control for the first and second sources of radiation.

The projection apparatus advantageously or alternatively as a separate invention comprises at least two radiation sources, in particular light sources, for radiating respective beams as well as a projection device for projecting, in particular deflecting, the beams onto a projection screen. In doing so, at least two of the radiation sources are aligned such that they emit the beams with a predetermined angle with respect to each other and thus do not require further optical elements for generating non-collinearity. Thus, the projection apparatus may be designed simpler, more space saving and more cost effective. Furthermore, possible sources of error related to optical beam guiding, due to manufacturing tolerances of the deflecting optics and due to operating influences such as a warming, are omitted. In addition, without a targeted adjustment of the polarization state any number of sources of a color may be directed onto the scanner mirror, which likewise may result in a brighter image effect.

The number of radiation sources is not limited and may for example comprise three (e.g. for red, green and blue light; RGB) or more. The colors of light are, however, not limited to RGB.

In order that for example a acceptable white light may be generated, a given relation among different colors has to be maintained, for example 640 nm (red)—53%; 522 nm (green)—30%; 450 nm (blue)—17%. For this reason different laser powers are required for each color. By means of application of two laser diodes the single laser diodes may be operated at low power, equivalent to a low current. Since the output power influences the life span of lasers in particular a RRBG combination may achieve a higher durability.

Since in addition it is generally technically complex to achieve a higher diode laser power in the blue spectral range (for example at 450 nm) it may be favorable to use two or more blue lasers (for example RGBB or RRGBB) in power critical applications.

Preferably, at least one laser beam per color is directed onto the projection device in non-collinear configuration.

As the light both visible light as well as invisible light, for example infrared or ultraviolet light may be used.

An application of infrared light has the advantage that by means of the coded light information in the infrared range a so called active display may be operated, which locally responds to this information by means of optical or electro-optical elements to thus generate the required color effect.

An application of ultraviolet light has the advantage that by means of the coded light information in the ultraviolet range a luminescent display may be operated in which a fluorescent substance is activated by the ultraviolet beam to generate the required color effect.

As a projection device a movable device may be used with appropriate actuation leading to a temporal deflection of a laser beam. Examples comprise one dimensional deflection mirrors, two dimensional deflection mirrors and/or respective combinations of deflection units. Two dimensional projection apparatuses having large deflection angles may for example be realized from an appropriate device comprising two mirrors respectively deflecting in one dimension, wherein the mirrors rotate around their own axes with a respective fixed angular speed. Projection apparatuses having large deflection angles may be realized by means of miniaturized electro-mechanical systems (MEMS) (for example employing Si-Technology). In this connection the large deflection angles may for example be achieved by applying a high driver voltage and/or by operating the MEMS in vacuum.

Advantageously, an angle between two non-collinear beams is smaller than a maximum mechanical angle of deflection of the projection device in a plane defined by the angle, less 5° to 15°, in particular less about 10°. For this purpose the projection device preferably has a large mechanical angle of deflection. Projection devices having large angles of deflection have the advantage that also with small distances between the projection apparatus ('projector') and the projection screen a large screen-size is feasible. In addition, these have the advantage that thus larger angles between the beams of the radiation sources are feasible. By applying a ratio significantly larger than one between the absolute value of the full angle of deflection of the projection device and the absolute value of the difference in angles of two beams the brightness effect of the projectors may be increased by applying several radiation sources of one color.

A further projection apparatus comprises at least two radiation sources for collinearily emitting respective beams, a deflection system for non-collinearly deflecting the previously collinear beams and a projection device for deflecting the non-collinear beams onto a projection screen. Das deflection system further comprises at least one micro-optical element common to the beams to be deflected, for example an array of lenses, a phase changing element or an optical element having a refractive index gradient. Feasible radiation sources and projection devices have already been described above.

For a particularly compact arrangement at least two of the radiation sources then are stacked, for example together on a semiconductor chip or a module.

It is favorable for both of the projection apparatuses if these comprise at least one deflection element for deflecting at least one of the beams between the source of radiation and the projection device in such a way that the at least one beam is convoluted.

In a favorable embodiment at least one beam path of a blue beam and one beam path of a red beam are carried out convoluted, wherein a beam path of a green beam is carried out non-convoluted. Thus, the green laser may be arranged applying favorable utilization of space, since a green laser to date dependent on design for the most part may not be miniaturized to the extent as this is feasible for blue or red lasers. Blue and red laser are for example available in the form of semiconductor lasers.

In an alternative embodiment all beams are preferably carried out convoluted.

It is favorable for a precise alignment of the pixels, if the radiation sources are carried out in the form of laser sources, for example as laser diodes.

The resulting misalignment of the pixels from the single beams in the image plane is preferably compensated by means of the above described projection method.

The quoted favorable characteristics of the projection apparatus may analogously also serve as favorable embodiments of the method for projecting an image.

BRIEF DESCRIPTION OF THE DRAWINGS

On the basis of the figures and the exemplary embodiments the invention is to be described in more detail.

DETAILED DESCRIPTION

Figure 1:
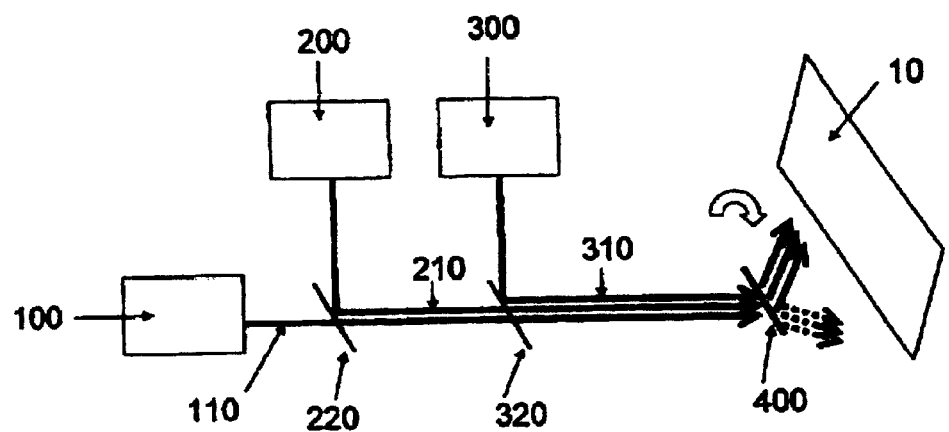
FIG. 1 shows a schematic configuration of a projection apparatus having three radiation sources, for example lasers, and a projection screen.

FIG. 1 shows the schematic configuration of a projection apparatus having three radiation sources 100, 200 and 300. These radiation sources emit the beams 110, 210, and 310. Since the three radiation sources can not all be positioned at the same location, the beams of the sources of radiation 200 and 300 are deflected by means of the deflection mirrors 220 and 320 and aligned with beam 110. The three beams hit the first mirror 400 which is movable. By means of the motion of the first mirror 400 the three beams 110, 210 and 310 may be directed onto the projection screen 10. By means of appropriate motion of the mirror 400 thus an image is generated spot by spot on the projection screen 10. This method for projecting an image is also known as "Flying Spot Method". The three radiation sources 100, 200 and 300 are lasers in a preferred embodiment, whereby the beams 110, 210 and 310 are laser beams. It is favorable to choose the colors of the lasers to be red, blue and green. Thus, any number of colors in the color spectrum may be generated. Thereby a very versatile image may be generated on the projection screen 10. In an ideal case the three beams 110, 210 and 310 superimpose each other exactly by means of the configuration shown in FIG. 1, so that the desired reference impression results. However, minimal angular deviations caused by production lead to a deviation of the beams of each other, which results in an actual impression which deviates from the reference impression.

Figure 2:
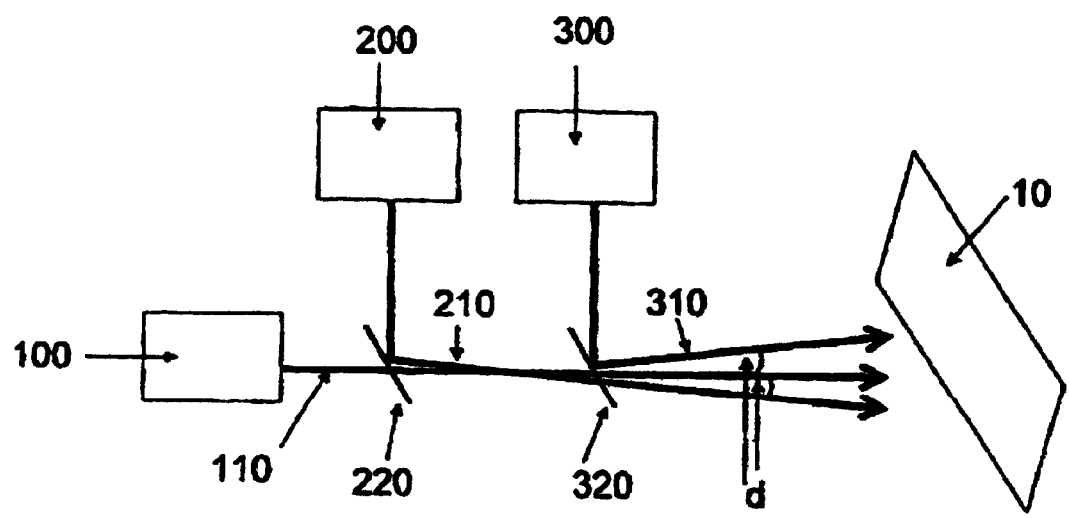
FIG. 2 shows the schematic configuration of a projection apparatus having three radiation sources, for example lasers, and a projection screen and a deviation of the beams of each other.

Such a deviation of angle d can be seen in FIG. 2. It is to be seen here that the three beams 110, 210 and 310 show deviations of each other, which is also reflected on the projection screen 10. In many cases it is impossible and very hard, respectively, to improve projection apparatuses mechanically to such an extent that such a angular deviation is avoided. In many cases the angles may also change during operation due to thermal stress.

Figure 3:
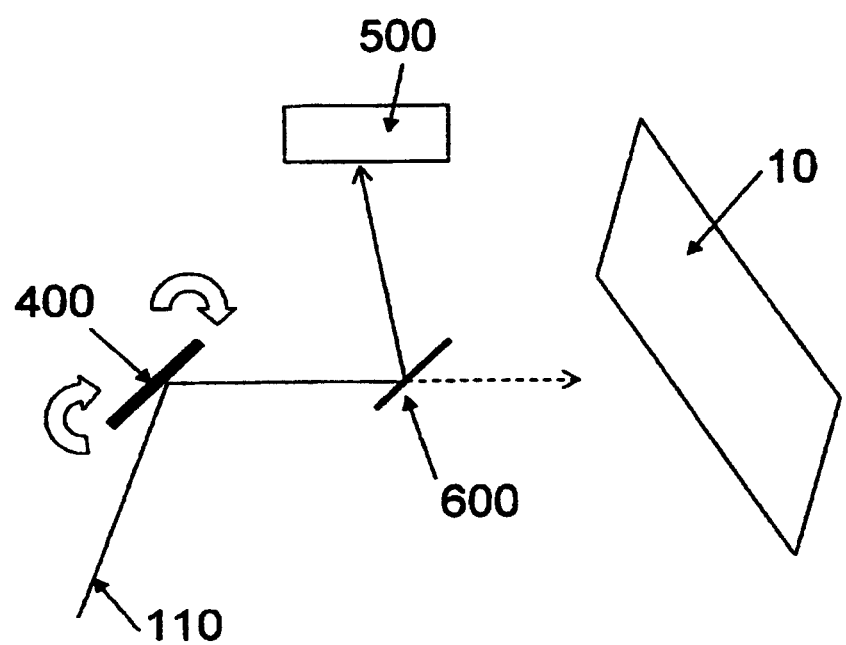
FIG. 3 shows the schematic configuration of an embodiment of the method and of the procedure, respectively, for measuring the position of the beams.

For this reason a measurement method and a measurement procedure, respectively, for positioning the beams is provided in the present invention as shown in FIG. 3. For example, in FIG. 3 the measurement of the position of the beam 110 can be seen. This beam is deflected by means of the movable first mirror 400 and is projected onto the projection screen 10. Between first mirror 400 and projection screen 10 a further second mirror 600 is arranged. This may be semi-transparent, whereby a portion of the beam 110 may be further projected onto the projection screen 10, another portion of the beam is however deflected by mirror 600. The deflected beam 110 is projected onto a detector 500. In the various embodiments of the invention it is feasible to determine the position of the beam 110 during the operation of the projection apparatus or prior to the operation of the projection apparatus. In a so called offline-operation in fact radiation in the direction of the projection screen is applied at the time of the measurement of the position of the beams, however, no image information is transmitted. The so called offline-operation is to mean, that the accomplishment of the measurement of the position of the beams is carried out during the projecting operation. With respect to FIG. 3 both the offline-operation as well as the online-operation can be described.

Both during offline-operation as well as during online-operation two different methods may be applied. One method comprises a variable mirror position and a stationary detector, the other method a variable detector position with a fixedly defined mirror position.

As a first exemplary embodiment the option for offline-operation having a stationary detector is to be described. In this connection, for the accomplishment of the measurement of the position of the beams only one single beam is operating at any one time. The second mirror 600 may be semi-transparent or non-transparent, since it is not required that the beam has to be projected onto the projection screen. The second mirror 600, however, should be positioned such that it directs the respective beam, which is currently operating, at least partially onto a detector 500 having a fixed position. The respective beam directed onto the detector 500 thereby generates a projection on the detector. The first movable mirror 400 is now moved so long as to have an orientation in which a maximum intensity of the respective beam is measured at detector 500. This is carried out individually for each beam, for example for the beam 110, 210 and 310. It is particularly favorable, if for each of the beams one further orientation of the first mirror 400 is determined where the maximum intensity of the beam is measured at the first detector 500. This adds to an increase of the measurement accuracy. The respective orientations of the first mirror 400 may respectively be measured contactless by means of the capacitance between the first mirror 400 and a counterpart. It is also feasible to measure the orientations of the first mirror 400 by means of a mechanical sensor. Furthermore, the orientation of the mirror may respectively be determined thus that the first mirror 400 is irradiated with an additional beam whose deflection is determined by means of a second detector. In doing so, it is favorable if the additional beam at any one time is arranged having an inclined angle in relation to the beam which is currently operating. From the orientations of the first mirror 400 measured, in the following differences may be calculated from the orientations of the mirror for the first beam, a second and a third beam. The determination of the orientation of the mirror and of the difference of the orientations of the mirror for the respective beams serves to determine the actual deviation of the beams of each other. The measurement of the position of the beams may thus be carried out internal or external to the device. From the difference of the orientations of the mirror for the respective beams a angular deviation between the beams may be determined.

A further embodiment of the invention is the measurement method of the beam position during offline-operation with variable detector position. In this connection, the first mirror 400 is held in at least one fixed orientation for each beam. Detector 500 is brought into one respective position for each beam, for example for the beams 110, 210 and 310, in which a maximum intensity of the respective beam is measured at the detector. The measurement of the position of the detector may be carried out internal or external to the device. The measurement internal to the device is carried out contactless by means of the capacitance between the detector and a counterpart or by means of a mechanical sensor. If it is desired to avoid the measurement of the detector position, instead of a single detector a plurality of detectors (detector array) may further be used for the determination of the positions of the projections of the beams. In doing so, the plurality of detectors is positioned such that all positions of the projections of the beams on the plurality of detectors may be measured without having to move the plurality of detectors. By consecutively measuring the positions of the projection of the beams on the plurality of detectors a angular deviation between the beams is determined which is used for determining the actual deviation of the beams of each other on the projection screen.

During online-operation the second mirror 600 is semi-transparent and installed permanently in order to particularly favorable direct a portion of the beams onto the projection screen to generate an image and to simultaneously direct another portion of the beams onto the detectors to determine the deviation of the beams of each other. In other words, all colors are operating simultaneously, which is to mean that an image is generated on the projection screen 10 while simultaneously the position of the beams on a detector 500 is measured. The deflection of the beams, for example of the beams 110, 210 and 310, onto the detector 500 is carried out by means of the second mirror 600. Since all beams are operating simultaneously it is required to provide certain elements in the beam path for separating the beams in front of the detector 500. For this purpose, a wavelength selective filter is suitable for example, which is provided between the second mirror 600 and detector 500. This filter allows for only one beam to reach the detector 500 at any one time, while the other beams are blocked. Thus, the respective position of the projection of one beam may be measured. A further possibility to separate the beams is a diffractive element which is provided behind the second mirror 600. A diffractive element will take care that the beams are directed into different directions and thus also will be separated.

During online-operation with a stationary detector a plurality of detectors is used as the detector. The respective beam which is directed onto the plurality of detectors generates a projection on this plurality of detectors. The first mirror 400 again is brought into different orientations in which the respective beams on the plurality of detectors may be measured by means of an intensity maximum. This may advantageously again be carried out several times for each beam and respectively a new orientation of the mirror may be determined. The orientations of mirror 400 may respectively be measured internal or external to the device. These are, for example, the contactless measurement by means of the capacitance between the mirror 400 and a counterpart or the measurement by means of a mechanical sensor. As an external option it may be used the irradiation with an additional beam whose deflection is determined by means of a further detector. This additional beam is advantageously arranged having an angle inclined with respect to the remaining beams. The orientations of the first mirror 400 determined such are used to determine differences of mirror orientations for the respective beams. From these differences again angular deviations between the respective beams are determined and from these the actual deviation of the beams on the projection screen is calculated.

During online-operation it is further feasible to bring the first mirror 400 into defined orientations for each beam. A detector 500 may be brought into a position for each beam in which a maximum intensity of the respective beam is measured at the detector. The measurement of the position of the detector may be carried out internal or external to the device. The internal measurement is the contactless measurement by means of the capacitance between the detector and a counterpart or the measurement by means of a mechanical sensor.

Further, a plurality of detectors may be used which are positioned such that all projections of the beams may be measured simultaneously. In doing so, a motion of the plurality of detectors is not required. From the positions of the projections of the beams on the plurality of detectors a angular deviation between the respective beams may be determined. In turn, using the angular deviation the actual deviation of the beams of each other on the projection screen 10 may be determined. The difference between the two methods during online-operation, once with stationary detector and once with movable mirror exists in that with the stationary detector a signal is sent when the detector indicates a maximum intensity maximum. If the mirror has a defined orientation, a signal is sent if the mirror has this defined orientation. Both signals make sure that the temporal intensity variation of the control of the radiation sources is carried out.

Figure 4:
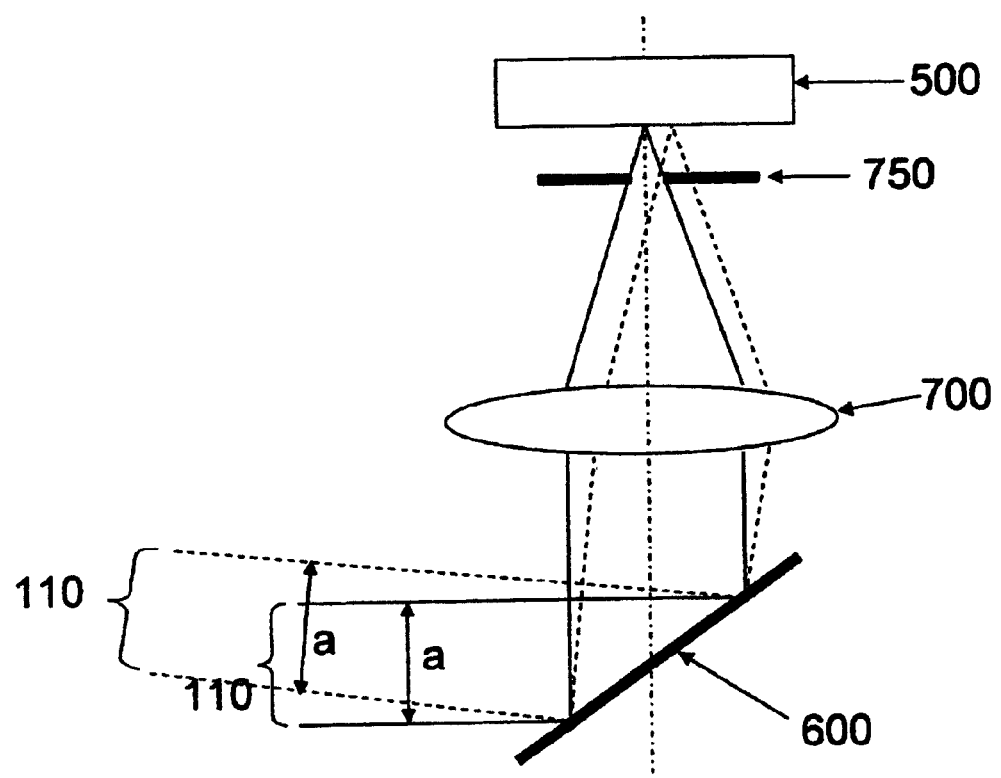
FIG. 4 shows the schematic configuration for focusing the beams by means of a lens in the measurement arrangement.

From FIG. 4 the focusing of the beams in front of the detector can be seen schematically. The provision of a lens 700 between the second mirror 600 and detector 500 is particularly favorable in order to achieve an improvement of the measurement accuracy. Each, foe example beam 110, has a technically conditioned width a. This width may be minimized by means of the provision of a lens. By further providing an aperture 750 between lens 700 and detector 500 the correct position of the beam may further be defined. Due to motion of mirror 600 the position of the projection of beam 110 is moved and may be brought into an orientation where the beam exactly meets detector 500 through the aperture. A focused beam results in a exact finding concerning the position of its projection on the detector. The application of an aperture and a lens may reduce the beam diameter to about 20 to 30 μm or even less.

Figure 5:
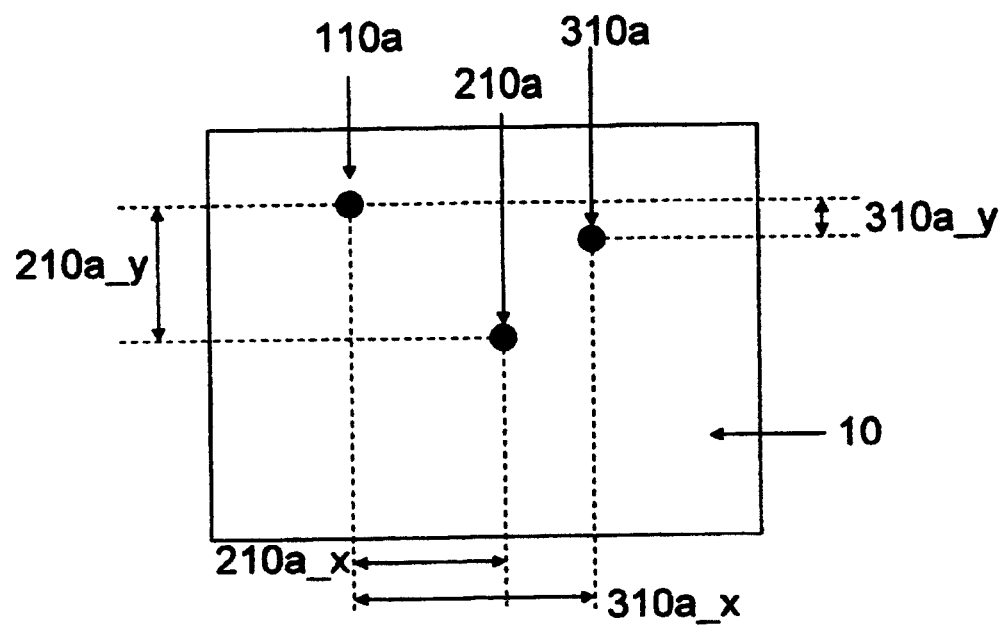
FIG. 5 shows the projections of the beams onto the projection screen and the determination of the deviation of each other.

From FIG. 5 an example for the determination of the deviation of the projections of the beams on the projection screen 10 can be seen. The projections of the beams 110, 210 and 310 can be seen as spots 110a, 210a and 310a on the projection screen 10. The three spots have two deviations each if for example a reference point 110a is chosen. Spot 210a deviates from spot 110a in x and y directions. The differences are designated 210a-y and 210a-x. Similarly, the projection of beam 310, 310a has a deviation in y direction and x direction in relation to the spot of the projection 110a. These deviations are designated 310a-y and 310a-x. Therefore relative deviations of the projections in relation to a chosen reference projection spot are achieved. From these deviations angular deviations may be determined. For example, the assumption that a pixel misalignment by one row and one column with a resolution of 1024×768, a projection distance of 1.5 m and a image size of 42 cm×29.7 cm results in a angular deviation of 0.015° in the row and 0.016° in the column. The angular deviations in turn result in the determination of the actual deviations of the projections on the projection screen.

From the angular deviations a phase shift of the beams in relation to each other may be determined. The phase shift relates to the electronic signals for the activation of the respective beams. If the electronic signals of the respective beams are modulated by the phase shift determined, which is to mean a temporal delay of the single beams, the desired color effect on projection screen 10 may be reconstructed.

Figure 6:
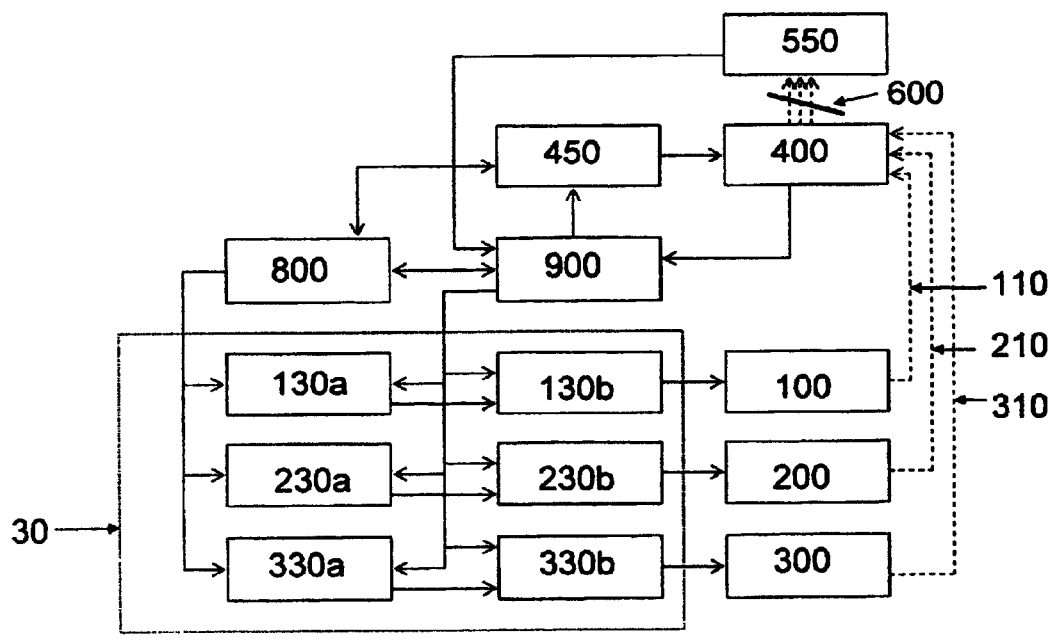
FIG. 6 shows a schematic configuration of a projection apparatus for implementing the method for improving the image quality.

FIG. 6 schematically shows the implementation of the above described exemplary embodiments of the invention into an embodiment of a projection apparatus. Here, a projection apparatus can be seen which comprises a video electronics 800, which results in projecting motion pictures or still pictures. Furthermore, a central control unit 900 is provided, preferably on a semiconductor chip. The video electronics 800 feeds data to the electronic control 30 for the radiation sources. The electronic control 30 for the radiation sources may be comprised of delay elements 130a, 230a and 330a for each source of radiation 100, 200 and 300 and of drivers for each source of radiation 130b, 230b and 330b. The radiation sources, which advantageously are lasers, send the beams 110, 210 and 310 to a movable first mirror 400. This first mirror 400 is actuated by a first electronic driver 450. The first mirror 400 directs the beams onto a projection screen. Arranged between the mirror 400 and a detection device 550 for the accomplishment of the measurements of the beam positions is a second mirror 600 which directs the beams in the desired direction. The detection device 550 is designed according to the above described exemplary embodiments and may in particular comprise a first detector or a plurality of detectors. Control unit 900 is connected to the first mirror 400, to the detection device 550 and to the electronic signal 800 for generating an image via read data lines. This means control unit 900 receives data concerning the orientation of mirror 400, concerning the progress of the electronic signals for generating an image and concerning the results of the measurements of detection device 550. Furthermore, control unit 900 is connected via write data lines with the driver of the first mirror 450, the electronic control 30 for the radiation sources and the electronic signal 800 for generating an image. This means control unit 900 may, from the determined data, which it has received from the read lines, send revised data to the driver of the first mirror 450 for an updated orientation of the mirror, to the electronic control for the radiation sources for regulating the beams 110, 210 and 310 and to the electronic signal 800 for generating an image for temporal intensity variation of the signals, which are required in light of the new conditions. As an example, the delay elements 130a, 230a and 330a may such assure that the radiation sources 100, 200 and 300 send beams with modulated intensity at modulated points in time in order to improve the image quality on the projection screen 10. From the mirror orientations determined for each beam phase shifts are determined, from which control signals are sent to the delay elements.

The above method and the above projection apparatus are not limited to correct undesired angular deviations of superimposed beams on the projection screen, but may particularly favorable also be used to correct angular deviations of beams on the projection screen, if the angular deviation is predetermined.

Figure 7:
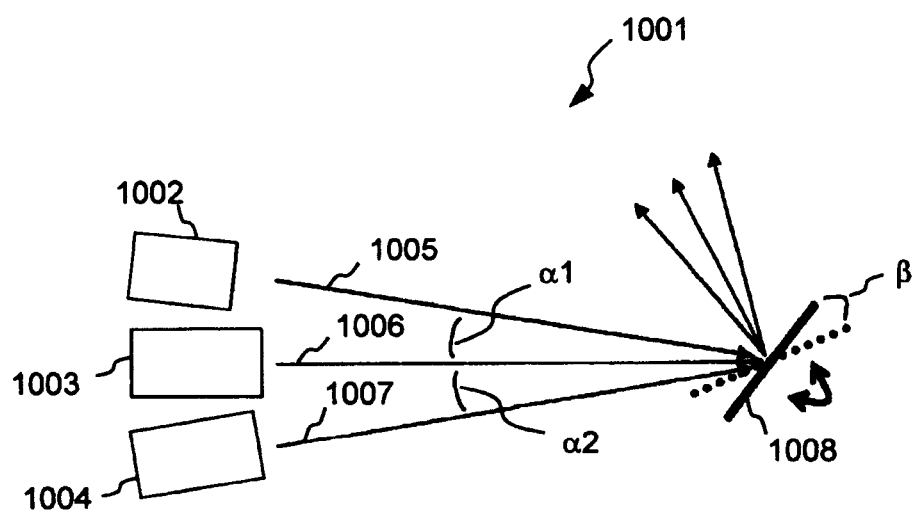
FIG. 7 schematically shows a further embodiment of a projection apparatus.

For this purpose FIG. 7 sketchily shows an embodiment of a projection apparatus 1001, which comprises three laser sources in each case adjusted with an angle in relation to each other, namely a red emitting laser diode 1002, a green radiating laser diode 1003 and a blue radiating laser diode 1004. By way of the angled orientation of lasers 1002, 1003, 1004 also the respective emitted laser beams 1005, 1006, 1007 are arranged having predefined angles with respect to each other, and such are non-collinear. In this example the angle between the red beam of light 1005 and the green beam of light 1006 is designated $\alpha 1$, and the one between the green beam of light 1006 and the blue beam of light 1007 is designated $\alpha 2$. The beams of light 1002, 1003, 1004 without further deflection non-collinearily hit a scanning mirror 1008 (for example analogous to the scanning mirror 400 of the above FIGs), which as indicated by the arrow and the dotted line is deflectable by an operational maximum mechanical angle of deflection $\beta$ in the viewing plane.

The exemplary embodiment is shown represented only in one plane for the purpose of better clarity. Generally the laser diodes 1002, 1003, 1004 may be arranged in any order in relation to each other. Furthermore, also several laser sources 1002, 1003, 1004 may be used for each color, wherein the colors do not have to be limited to red, green and blue. In order to form beam characteristics furthermore one or several optical elements, such as lenses, collimators and so on, arranged in the beam path may be used.

In the exemplary embodiment shown the following constraint is met for the angular deviations $\alpha i$ between two beams 1005, 1006, 1007: the sum of the angular deviations $\alpha i$ between two beams 1005, 1006, 1007 is smaller than the operational maximum mechanical angle of deflection $\beta$ of the scanning mirror 1008 minus 10°, thus $\Sigma \alpha i = \beta - 10°$. This constraint applies to the viewing in a plane and analogously may be transferred to a second plane perpendicular to this plane.

Figure 8:
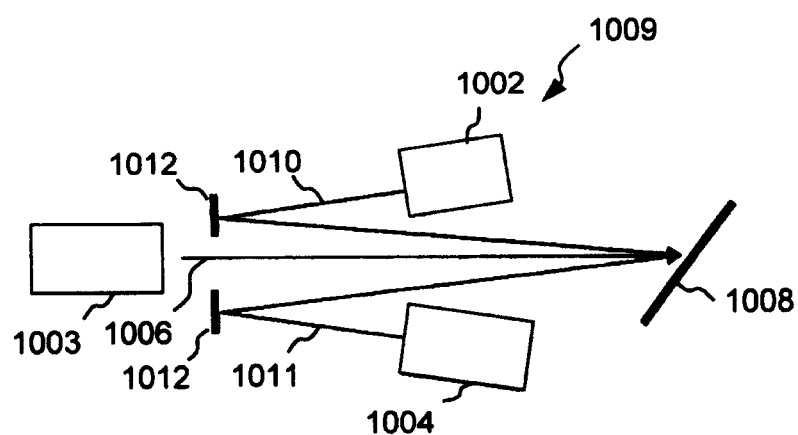
FIG. 8 schematically shows yet another further embodiment of a projection apparatus.

FIG. 8 sketchily shows a projection apparatus 1009 according to a second embodiment. This embodiment now comprises a convolution of two beam paths 1010, 1011 for the red laser diode 1002 and the blue laser diode 1004, respectively. For this purpose separate deflection elements are used for the single laser beams 1010, 1011, such as mirror 1012. In an alternative embodiment deflection mirrors 1012 may for example be used for one or two other colors. The arrangement shown may be implemented more compact than the one of FIG. 7.

Figure 9:
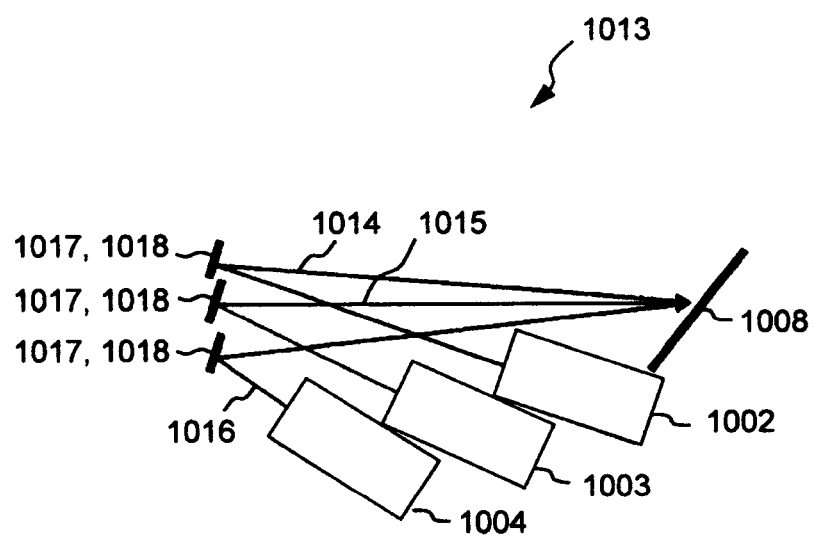
FIG. 9 schematically shows yet another further embodiment of a projection apparatus.

FIG. 9 sketchily shows a projection apparatus 1013 according to a third embodiment, where now a deflection of the beams of light, here of all beams of light 1014, 1015, 1016, is carried out by means of a single mirror array 1017 having identically implemented and arranged single mirrors 1018. Here, the arrangement of the light sources 1002, 1003, 1004 is again not limited to one plane, but may be realized two-dimensionally.

Figure 10:
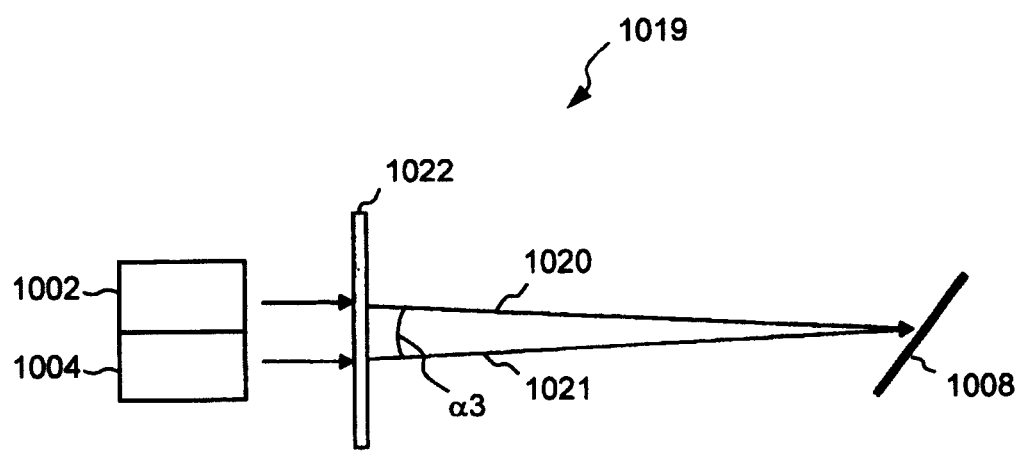
FIG. 10 schematically shows yet another further embodiment of a projection apparatus.

FIG. 10 sketchily shows a projection apparatus 1019 according to a fourth embodiment having stacked laser sources, namely a red laser source 1002 and a green laser source 1004. These may, for example stacked as a bar or "submount", be accommodated on a shared semiconductor chip or module. However, the projection apparatus 1019 may generally comprise also three or several laser sources in the form of submounts, among them also green laser sources.

Beamforming and directional control of the laser beams 1020, 1021 onto the scanner mirror 1008 is carried out by means of a micro-optical element 1022 arranged in the beam path, for example a array of lenses, a phase changing element or a optical element having a refractive index gradient. By means of the micro-optical element 1022 the beams of light 1020, 1021 at first emitted collinearily by the lasers 2, 4 are deflected with an angle α3 with respect to each other and non-collinearily radiated onto the scanner mirror 1008. Since appropriate green laser sources are not yet available in the form of stackable laser sources a green laser source (without representation), preferably without further deflection, will be directed non-collinearily with respect to the other beams of light 1020, 1021 onto the scanner mirror 1008.

The above mentioned exemplary embodiments for the predetermined angular deviation have the advantages that they do not require optical elements which let pass a defined spectral range and reflect a second spectral range. This has the advantage that optical losses may be minimized and thus a brighter image effect is achieved on the screen. In addition, without considering the polarization state any number of sources of a color may be directed onto the scanner mirror, whereby again a brighter image effect may be achieved. The non-collinear beamguiding furthermore makes it feasible to implement a laser projector having small dimensions. In addition, this laser projector may be manufactured with low production efforts by means of resigning a collinear beamguiding, since the effort for the collinear adjustment (typically in the dimension of micro-optics) is omitted. Furthermore an accuracy of illustration is increased.

The method of using the angular deviation is not limited to a coaction with the deviation reducing method for projecting an image described in FIG. 1 to FIG. 6, but is also a separate invention, in which the image projection may be carried out in all forms known to a person skilled in the art, in particular in all further forms of deviation reduction known to a person skilled in the art.

The invention generally is not limited by the description on the basis of the exemplary embodiments. Rather the invention comprises each new characteristic as well as any combination of characteristics, which in particular includes each combination of characteristics from the patent claims, even if this characteristic or this combination by oneself is not explicitly provided in the patent claims or the exemplary embodiments.

The invention claimed is:

1. A method for projecting an image onto a projection screen by means of at least one first and one second beam, wherein by means of the superimposition of the projection of the first and of the second beam onto the projection screen a reference impression of the image is to be generated, wherein the at least first and second beams for projecting the pixels are directed onto the projection screen by means of a first mirror, wherein by means of an actual deviation of the projection of the first and of the second beam onto the projection screen an actual impression of the image is generated which deviates from the reference impression, wherein the method comprises the method steps A) determination of the actual deviation of the projection of the first from the second beam on the projection screen, B) temporal variation of the intensity of the first and/or second beam according to the deviations determined in method step A) to generate the reference impression,
wherein for the accomplishment of method step A) a second mirror is arranged between the first mirror and the projection screen and at any one time only a single beam is operating,
wherein the second mirror is oriented such that it directs the respective beam, which is operating, at least partially onto a detector having a fixed position,
wherein the first mirror for the first beam is brought into a first orientation in which a maximum intensity of the first beam is measured at the detector and wherein the first mirror for the second beam is brought into a second orientation in which a maximum intensity of the second beam is measured at the detector and wherein the first and second orientations of the first mirror are respectively determined thus that the first mirror is irradiated with an additional beam and the deflection thereof is determined by means of a second detector, wherein the orientation of the first mirror is determined by means of the deflection of the additional beam.

2. The method according to claim 1, wherein the additional beam is arranged having an inclined angle with respect to the at least first and second beams, wherein from the first and the second and/or the third and the fourth orientations of the first mirror an angular deviation between the first and the second beam is determined which is used for the determination of the actual deviation of the first and the second beam on the projection screen.

3. The method according to claim 1, wherein during the method step A) the first mirror is held in at least one fixed orientation for each beam.

4. The method according to claim 3, wherein a detector is brought into a first position for the first beam and is brought into a second position for the second beam at which a maximum intensity of the respective beam is measured at the detector.

5. The method of claim 3, wherein for the determination of the position of the projection of the beams on the detector a plurality of detectors is provided wherein from the positions of the projection of the beams on the plurality of detectors an angular deviation between the first and second beams is determined which is used for the determination of the actual deviation of the first and second beams on the projection screen.

6. The method according to claim 5, wherein the plurality of detectors is positioned such that all positions of the projections of the beams on the plurality of detectors may be measured.

7. A projection apparatus comprising at least one first and second source of radiation for generating a first and second beam, a projection device for projecting the first and second beams onto a projection screen, wherein an image is projected onto the projection screen, an electronic control for the first and second source of radiation, a detection device for detecting a deviation between the projections of the first and second beams on the projection screen, wherein the projection apparatus is arranged such that depending on the deviation between the projections of the first and second beams on the projection screen detected by means of the detection device the electronic control for at least one of the first and second source of radiation are configured to be delayed such that the deviation is reduced and corrected, respectively, wherein the at least first and second sources of radiation comprise lasers, wherein the projection device comprises a first mirror for directing the at least first and second beams onto the projection screen,
wherein a second mirror is arranged between the first mirror and the projection screen and at any one time only a single beam is operating,
wherein the second mirror is oriented such that it directs the respective beam, which is operating, at least partially onto a detector having a fixed position, wherein the first mirror for the first beam is brought into a first orientation in which a maximum intensity of the first beam is measured at the detector and wherein the first mirror for the second beam is brought into a second orientation in which a maximum intensity of the second beam is measured at the detector and wherein the first and second orientations of the first mirror are respectively determined thus that the first mirror is irradiated with an additional beam and the deflection thereof is determined by means of a second detector, wherein the orientation of the first mirror is determined by means of the deflection of the additional beam.

8. A method for projecting an image onto a projection screen by means of at least one first and one second beam, wherein by means of the superimposition of the projection of the first and of the second beam onto the projection screen a reference impression of the image is to be generated, wherein the at least first and second beams for projecting the pixels are directed onto the projection screen by means of a first mirror, wherein by means of an actual deviation of the projection of the first and of the second beam onto the projection screen an actual impression of the image is generated which deviates from the reference impression, wherein the method comprises the method steps A) determination of the actual deviation of the projection of the first from the second beam on the projection screen, B) temporal variation of the intensity of the first and/or second beam according to the deviations determined in method step A) to generate the reference impression,
   wherein for the accomplishment of method step A) a second mirror is arranged between the first mirror and the projection screen and at any one time only a single beam is operating,
   wherein the second mirror is oriented such that it directs the respective beam, which is operating, at least partially onto a detector having a fixed position,
   wherein for the first beam a third orientation of the first mirror is measured in which the first beam has a maximum intensity on a second detector and wherein for the second beam a fourth orientation of the first mirror is measured in which the second beam has a maximum intensity on a second detector and wherein the third and fourth orientations of the first mirror are respectively determined thus that the first mirror is irradiated with an additional beam and the deflection thereof is determined by means of a second detector, wherein the orientation of the first mirror is determined by means of the deflection of the additional beam.

9. A method for projecting an image onto a projection screen by means of at least one first and one second beam, wherein by means of the superimposition of the projection of the first and of the second beam onto the projection screen a reference impression of the image is to be generated, wherein the at least first and second beams for projecting the pixels are directed onto the projection screen by means of a first mirror, wherein by means of an actual deviation of the projection of the first and of the second beam onto the projection screen an actual impression of the image is generated which deviates from the reference impression, wherein the method comprises the method steps A) determination of the actual deviation of the projection of the first from the second beam on the projection screen, B) temporal variation of the intensity of the first and/or second beam according to the deviations determined in method step A) to generate the reference impression,
   wherein for the accomplishment of method step A) a second mirror is arranged between the first mirror and the projection screen and at any one time only a single beam is operating,
   wherein the second mirror is oriented such that it directs the respective beam, which is operating, at least partially onto a detector having a fixed position,
   wherein for the accomplishment of the method step A) a second semi-transparent mirror is positioned between the first mirror and the projection screen and all beams are operating simultaneously, wherein they generate the actual impression on the projection screen, wherein the beams are partially directed onto a detector by means of the second mirror,
   wherein for the separation of the beams a filter is provided between the second mirror and the detector or a diffractive element is provided behind the second mirror,
   wherein the first mirror is brought into a first orientation in which the plurality of detectors measures an intensity maximum of the first beam and wherein the first mirror is brought into a second orientation in which the plurality of detectors measures an intensity maximum of the second beam, and wherein the first mirror is brought into a third orientation in which the plurality of detectors measures an intensity maximum of the first beam and wherein the first mirror is brought into a fourth orientation in which the plurality of detectors measures an intensity maximum of the second beam, wherein the first and second and the third and fourth orientations of the first mirror are respectively determined thus that the first mirror is irradiated with an additional beam and the deflection thereof is determined by means of a second detector, wherein the orientation of the first mirror is determined by means of the deflection of the additional beam and wherein the additional beam is arranged having an inclined angle with respect to the at least first and second beams.

10. A projection apparatus comprising at least one first and second source of radiation for generating a first and second beam, a projection device for projecting the first and second beams onto a projection screen, wherein an image is projected onto the projection screen, an electronic control for the first and second source of radiation, a detection device for detecting a deviation between the projections of the first and second beams on the projection screen, wherein the projection apparatus is arranged such that depending on the deviation between the projections of the first and second beams on the projection screen detected by means of the detection device the electronic control for at least one of the first and second source of radiation are configured to be delayed such that the deviation is reduced and corrected, respectively, wherein the at least first and second sources of radiation comprise lasers, wherein the projection device comprises a first mirror for directing the at least first and second beams onto the projection screen,
   wherein a second mirror is arranged between the first mirror and the projection screen and at any one time only a single beam is operating,
   wherein the second mirror is oriented such that it directs the respective beam, which is operating, at least partially onto a detector having a fixed position,
   wherein for the first beam a third orientation of the first mirror is measured in which the first beam has a maximum intensity on a second detector and wherein for the second beam a fourth orientation of the first mirror is measured in which the second beam has a maximum intensity on a second detector and wherein the third and fourth orientations of the first mirror are respectively determined thus that the first mirror is irradiated with an additional beam and the deflection thereof is determined by means of a second detector, wherein the orientation of the first mirror is determined by means of the deflection of the additional beam.

11. A projection apparatus comprising at least one first and second source of radiation for generating a first and second beam, a projection device for projecting the first and second beams onto a projection screen, wherein an image is projected onto the projection screen, an electronic control for the first and second source of radiation, a detection device for detecting a deviation between the projections of the first and second beams on the projection screen, wherein the projection apparatus is arranged such that depending on the deviation between the projections of the first and second beams on the projection screen detected by means of the detection device the electronic control for at least one of the first and second source of radiation are configured to be delayed such that the deviation is reduced and corrected, respectively, wherein the at least first and second sources of radiation comprise lasers, wherein the projection device comprises a first mirror for directing the at least first and second beams onto the projection screen, wherein a second mirror is arranged between the first mirror and the projection screen and at any one time only a single beam is operating, wherein the second mirror is oriented such that it directs the respective beam, which is operating, at least partially onto a detector having a fixed position, wherein a second semi-transparent mirror is positioned between the first mirror and the projection screen and all beams are operating simultaneously, wherein they generate the actual impression on the projection screen, wherein the beams are partially directed onto a detector by means of the second mirror, wherein for the separation of the beams a filter is provided between the second mirror and the detector or a diffractive element is provided behind the second mirror, wherein the first mirror is brought into a first orientation in which the plurality of detectors measures an intensity maximum of the first beam and wherein the first mirror is brought into a second orientation in which the plurality of detectors measures an intensity maximum of the second beam, and wherein the first mirror is brought into a third orientation in which the plurality of detectors measures an intensity maximum of the first beam and wherein the first mirror is brought into a fourth orientation in which the plurality of detectors measures an intensity maximum of the second beam, wherein the first and second and the third and fourth orientations of the first mirror are respectively determined thus that the first mirror is irradiated with an additional beam and the deflection thereof is determined by means of a second detector, wherein the orientation of the first mirror is determined by means of the deflection of the additional beam and wherein the additional beam is arranged having an inclined angle with respect to the at least first and second beams.

12. The method according to claim 9, wherein a plurality of detectors is used as the detector and the respective beam which is directed onto the plurality of detectors generates a projection on the plurality of detectors.

13. The method according to claim 9, wherein from the first and second and/or the third and fourth orientations of the first mirror an angular deviation between the first and the second beam is determined which is used for the determination of the actual deviation of the first and second beams on the projection screen.

14. The method according to claim 9, wherein in method step A) the first mirror has at least one defined orientation for each beam.

15. The method according to claim 14, wherein a detector for the first beam is brought into a first position and for the second beam is brought into a second position in which a maximum intensity of the respective beam is measured at the detector.

16. The method according to claim 14, wherein for the determination of the position of the projection of the beams on the detector a plurality of detectors is used and wherein from the positions of the projection of the beams on the plurality of detectors an angular deviation between the first and the second beam is determined which is used for the determination of the actual deviation of the first and second beams on the projection screen.

\* \* \* \* \*